United States Patent
Griffin et al.

(10) Patent No.: US 11,982,314 B2
(45) Date of Patent: May 14, 2024

(54) THRUST BEARING CAGE WITH PILOTING FLANGE

(71) Applicant: Schaeffler Technologies AG & Co. KG, Herzogenaurach (DE)

(72) Inventors: Joseph T. Griffin, Monroe, SC (US); James Brown, Rock Hill, SC (US); Alicia Vidal Ortiz, Puebla (MX)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 128 days.

(21) Appl. No.: 17/784,247

(22) PCT Filed: Dec. 4, 2020

(86) PCT No.: PCT/US2020/063294
§ 371 (c)(1),
(2) Date: Jun. 10, 2022

(87) PCT Pub. No.: WO2021/118879
PCT Pub. Date: Jun. 17, 2021

(65) Prior Publication Data
US 2023/0058652 A1 Feb. 23, 2023

Related U.S. Application Data

(60) Provisional application No. 62/947,656, filed on Dec. 13, 2019.

(51) Int. Cl.
*F16C 33/46* (2006.01)
*F16C 19/30* (2006.01)
(Continued)

(52) U.S. Cl.
CPC ............ *F16C 33/46* (2013.01); *F16C 19/305* (2013.01); *F16C 19/32* (2013.01); *F16C 19/463* (2013.01);
(Continued)

(58) Field of Classification Search
CPC ........ F16C 19/30; F16C 19/305; F16C 19/32; F16C 19/46; F16C 19/463; F16C 33/46;
(Continued)

(56) References Cited

U.S. PATENT DOCUMENTS 2,997,349 A      8/1961   Pitner
3,031,239 A *    4/1962   Pitner ................... F16C 19/55
                                                         384/623

(Continued)

FOREIGN PATENT DOCUMENTS

DE         2057620      *  5/1972
DE      102015206533 A1   10/2016
(Continued)

OTHER PUBLICATIONS

Translation of JP2006017201 obtained Dec. 13, 2023.*
Translation of DE2057620 obtained Dec. 7, 2023.*

*Primary Examiner* — James Pilkington
(74) *Attorney, Agent, or Firm* — Volpe Koenig

(57) ABSTRACT

A thrust bearing cage includes a piloting feature to radially locate a thrust bearing with respect to one of the shafts. Specifically, the bearing cage includes an axial extension at an outer diameter that extends beyond the rollers and around an outer diameter of end of the shaft. This feature permits elimination of a washer.

15 Claims, 4 Drawing Sheets

(51) Int. Cl.
  *F16C 19/32*  (2006.01)
  *F16C 19/46*  (2006.01)
  *F16C 33/54*  (2006.01)
  *F16C 33/66*  (2006.01)

(52) U.S. Cl.
  CPC ........ *F16C 33/4605* (2013.01); *F16C 33/546* (2013.01); *F16C 33/6681* (2013.01)

(58) Field of Classification Search
  CPC . F16C 33/4605; F16C 33/546; F16C 33/6681
  See application file for complete search history.

(56) References Cited

U.S. PATENT DOCUMENTS

| | | | |
|---|---|---|---|
| 5,293,688 A | | 3/1994 | Koch et al. |
| 5,630,670 A | * | 5/1997 | Griffin .................... F16C 19/30 |
| | | | 384/470 |
| 9,933,010 B2 | * | 4/2018 | Brown .................... F16C 19/55 |
| 2017/0292568 A1 | | 10/2017 | Makke |

FOREIGN PATENT DOCUMENTS

| | | | |
|---|---|---|---|
| DE | 102018100938 A1 | | 7/2018 |
| FR | 1223324 A | | 6/1960 |
| JP | 2006017201 | * | 1/2006 |
| JP | 2009041753 A | | 2/2009 |
| JP | 2019158145 | | 9/2019 |
| WO | 2018100084 | | 6/2018 |
| WO | 2019066809 A1 | | 4/2019 |

* cited by examiner

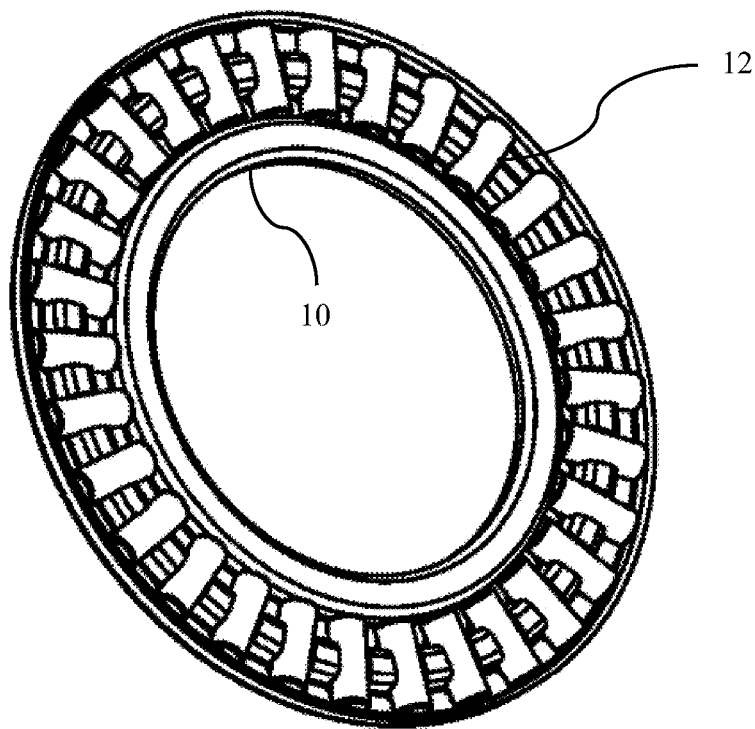
FIG. 1 – PRIOR ART
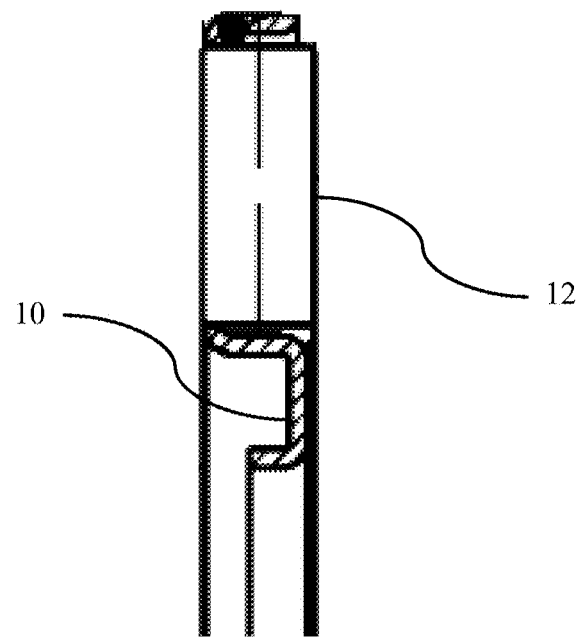
FIG. 2 – PRIOR ART

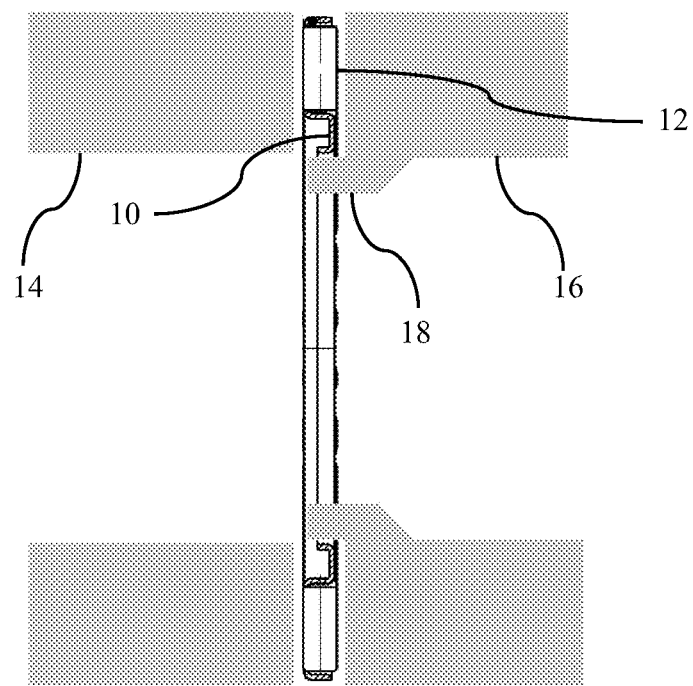
FIG. 3 – PRIOR ART
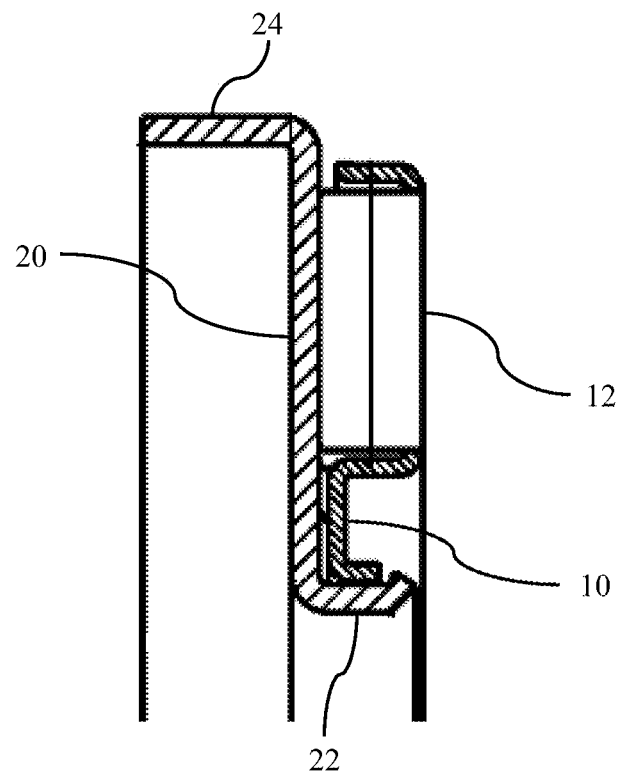
FIG. 4 – PRIOR ART

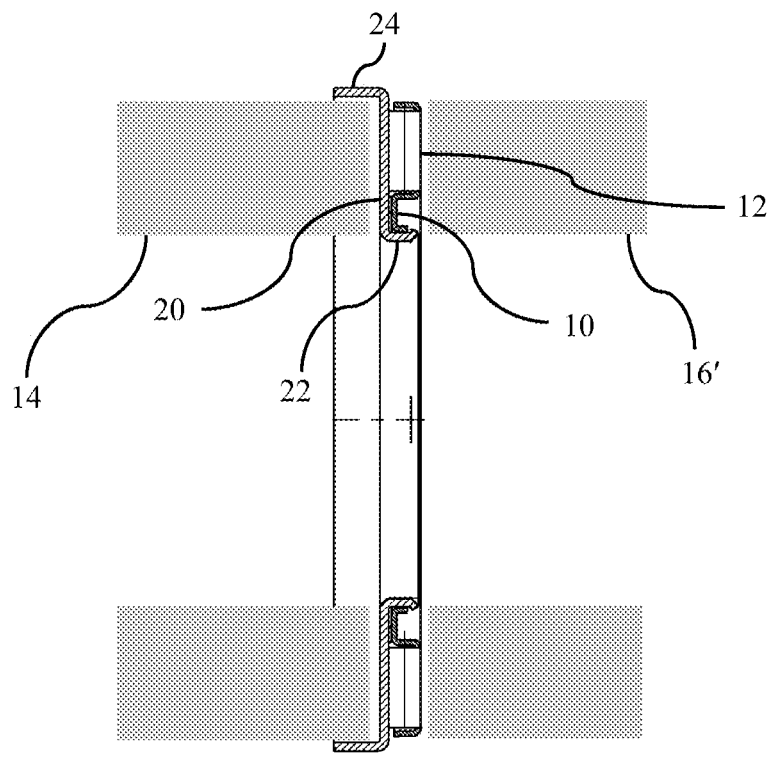
FIG. 5 – PRIOR ART
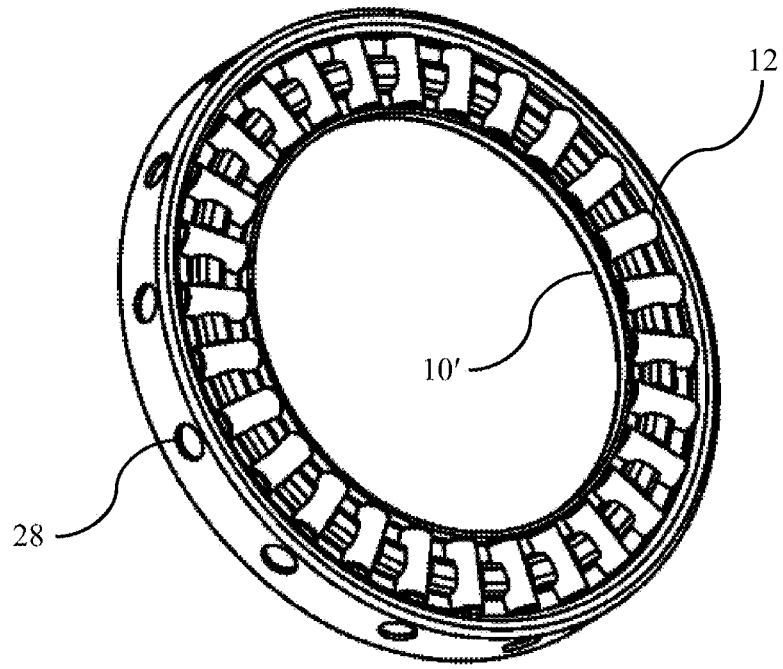
FIG. 6

THRUST BEARING CAGE WITH PILOTING FLANGE

CROSS-REFERENCE TO RELATED APPLICATIONS

This application claims priority to U.S. Provisional application 62/947,656 filed Dec. 13, 2019, the entire disclosure of which is incorporated by reference herein.

TECHNICAL FIELD

The disclosure relates to an axial roller bearing.

BACKGROUND

FIGS. 1 and 2 illustrate a conventional thrust bearing cage 10 and rollers 12. FIG. 1 is a pictorial view, whereas FIG. 2 is a cross sectional view. Each roller 12 is retained in a pocket defined by the cage. FIG. 3 illustrates how the cage and rollers of FIGS. 1 and 2 may be utilized between two coaxial shafts 14 and 16. The rollers 12 axially separate end faces of shafts 14 and 16 and transmit axial forces between the shafts. The end faces may include hardened races for the rollers. When there is relative rotation between shafts 14 and 16, cage 10 rotates at an intermediate speed. As a result, the contact between the rollers and the shaft end faces is predominantly rolling contact as opposed to sliding contact and introduce very little resistance to the rotation. The cage 10 positions the rollers 12 around the circumference. To properly position the rollers, the cage itself must be positioned concentrically with the shafts. In this application, radial positioning of the cage 10 is accomplished by piloting feature 18 of one of the two shafts. Only one of the two shafts includes the piloting feature. If both shafts had the piloting feature, the features would either be too short to properly accomplish the piloting function or would interfere with one another.

FIG. 4 illustrates a thrust bearing having a cage 10, rollers 12, and a washer 20. The washer includes a first axial portion 22 which provides piloting of the cage 10 relative to the washer. FIG. 5 illustrates how the bearing of FIG. 4 may be utilized between two coaxial shafts 14 and 16'. The washer includes a second axial portion 24 which provides piloting of the thrust washer relative to shaft 14. The axial portions 22 and 24 of washer 20 collectively ensure that cage 10 is concentric with shaft 14. Shaft 16' does not need to include a piloting feature. In this application, the rollers 12 bear against the washer 20 as opposed to bearing directly against the end face of shaft 14. Axial forces are transmitted from shaft 16', through rollers 12 and washer 20, to shaft 14. If the axial forces include impact loads, the washer 20 may be damaged.

SUMMARY

A bearing includes a cage and a plurality of rollers retained by the cage. The rollers may be cylindrical. The cage includes an axial extension extending axially beyond the rollers. The axial extension may define at least one hole to permit flow of lubricant. The axial extension may extend around the full circumference of the cage. The axial extension may be located at an outer diameter of the cage. Alternatively, the axial extension may be located at an inner diameter of the cage.

An assembly includes first and second shafts, a cage, and a plurality of rollers. The rollers are retained by the cage and bear against first and second ends of the first and second shafts, respectively. The cage includes an axial extension extending axially beyond the first axial end. The axial extension may define at least one hole to permit flow of lubricant. The axial extension may be located at an outer diameter of the cage and may extend beyond an outer diameter of the first end. The rollers may be cylindrical. The rollers may bear directly against the first and second ends.

BRIEF DESCRIPTION OF THE DRAWINGS

FIG. 1 is a pictorial view of a prior art axial roller bearing.

FIG. 2 is a cross-sectional view of a washerless prior art axial roller bearing.

FIG. 3 is a cross-sectional view of the bearing of FIG. 2 in an installed condition.

FIG. 4 is a cross-sectional view of a prior art roller bearing having a washer.

FIG. 5 is a cross-sectional view of the bearing of FIG. 5 in an installed condition.

FIG. 6 is a pictorial view of a washerless axial roller bearing.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 7:
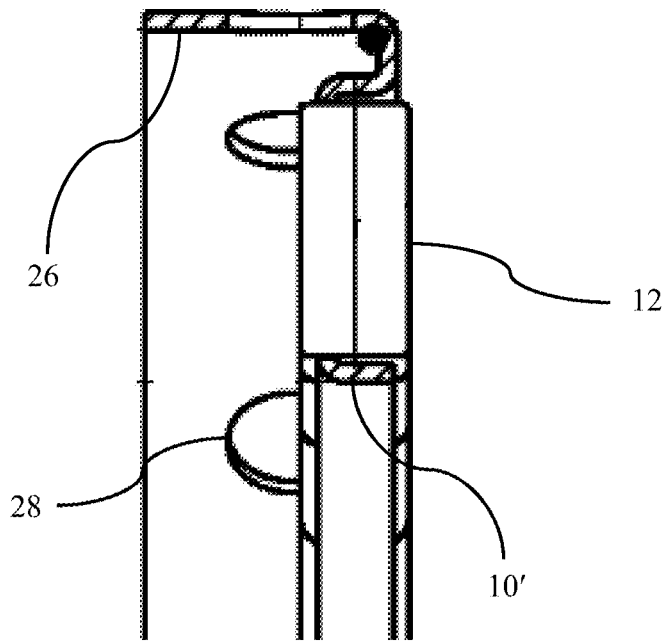
FIG. 7 is a cross-sectional view of the bearing of FIG. 6.

FIGS. 6 and 7 illustrate an improved thrust bearing cage 10' and rollers 12. FIG. 6 is a pictorial view, whereas FIG. 7 is a cross sectional view. Cage 10' includes an axial extension 26. In the embodiment illustrated, the axial extension is at an outer edge. A number of holes 28 may be included in the axial extension.

Figure 8:
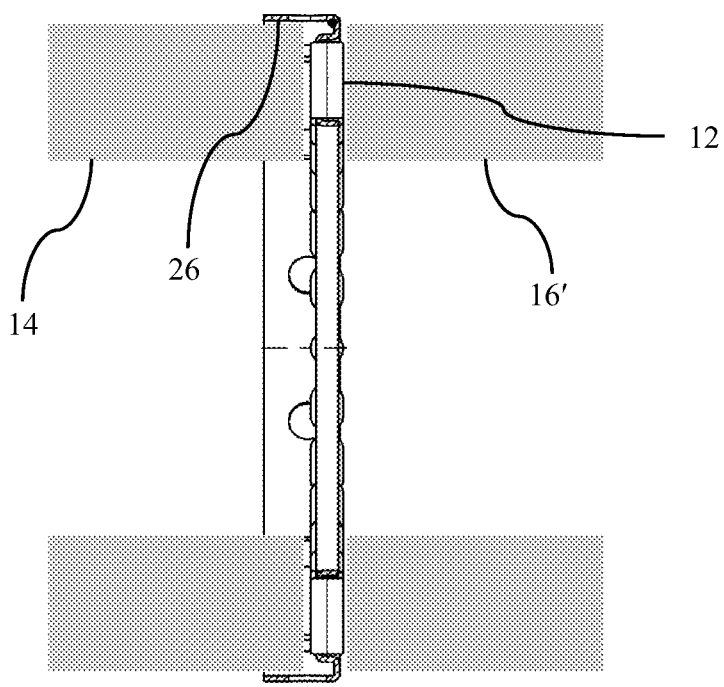
FIG. 8 is a cross-sectional view of the bearing of FIG. 6 in an installed condition.

FIG. 8 illustrates how the cage and rollers of FIGS. 6 and 7 may be utilized between two coaxial shafts 14 and 16'. Although hollow shafts are illustrated, one or both shafts may be solid. The rollers 12 axially separate end faces of shafts 14 and 16' and transmit axial forces between the shafts. The end faces may include hardened races for the rollers. In this application, radial positioning of the cage 10' is accomplished by the axial extension 26 and an outer surface of one of the two shafts. The optional holes 28 provide a path for lubricating fluid to exit the bearing. In an alternative embodiment, the axial extension may be at an inner edge of the cage and may interface with an inner surface of a hollow shaft.

Unlike the bearing of FIGS. 1-3, neither shaft needs a piloting feature. The shafts may be identical to one another, reducing the number of distinct parts in an assembly. The assembly of FIGS. 6-8 has fewer parts that the assembly of FIGS. 4-5, reducing cost. Furthermore, it is more robust in the presence of impact thrust loads.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, to the extent any embodiments are described as less desirable than other embodiments or prior art implementations with respect to one or more characteristics, these embodiments are not outside the scope of the disclosure and can be desirable for particular applications.

What is claimed is:

1. A bearing comprising:
   a cage; and
   a plurality of rollers retained by the cage, wherein the cage includes an axial extension extending axially beyond the rollers, the axial extension being a piloting feature and having a constant inner and outer diameter about a circumference of the axial extension, and wherein the axial extension defines at least one hole to permit a flow of lubricant.

2. The bearing of claim 1, wherein the axial extension extends around a full circumference of the cage.

3. The bearing of claim 1, wherein the axial extension is located at an outer diameter of the cage.

4. The bearing of claim 1, wherein the axial extension is located at an inner diameter of the cage.

5. The bearing of claim 1, wherein the rollers are cylindrical.

6. An assembly, comprising:
   a first shaft having a first axial end;
   a second shaft having a second axial end;
   a cage including an axial extension extending axially beyond the first axial end, the axial extension being a piloting feature and having a constant inner and outer diameter about a circumference of the axial extension; and
   a plurality of rollers retained by the cage and bearing against the first axial end and the second axial end;
   wherein the axial extension defines at least one hole to permit flow of lubricant.

7. The assembly of claim 6, wherein the axial extension is located at an outer diameter of the cage and extends beyond an outer diameter of the first end.

8. The assembly of claim 6, wherein the rollers are cylindrical.

9. The assembly of claim 6, wherein the rollers bear directly against the first end.

10. The assembly of claim 9, wherein the rollers bear directly against the second end.

11. A raceless axial bearing configured to be positioned between axial ends of first and second shafts, comprising:
    a cage including a plurality of pockets and an axial extension, the axial extension being a piloting feature and having a constant inner and outer diameter about a circumference of the axial extension;
    a plurality of rollers retained in the pockets; and
    wherein the axial extension extends axially beyond the rollers such that the bearing is self-piloting on a shaft end of one of the shafts and the rollers are adapted to directly contact the axial ends of the first and second shafts; and
    wherein the axial extension defines at least one hole to permit flow of lubricant.

12. The bearing of claim 11, wherein the axial extension extends around a full circumference of the cage.

13. The bearing of claim 11, wherein the axial extension is located at an outer diameter of the cage.

14. The bearing of claim 11, wherein the axial extension is located at an inner diameter of the cage.

15. The bearing of claim 11, wherein the rollers are cylindrical.

* * * * *